(12) United States Patent
Tanaka

(10) Patent No.: US 12,388,942 B2
(45) Date of Patent: Aug. 12, 2025

(54) STORAGE MEDIUM STORING PROGRAM CAUSING COMPUTER OF INFORMATION PROCESSING APPARATUS TO EXECUTE CONTROL METHOD FOR SETTING A USER AS A DESTINATION OF A NOTIFICATION OF AN EVENT, CONTROL METHOD FOR INFORMATION PROCESSING APPARATUS, AND INFORMATION PROCESSING SYSTEM

(71) Applicant: CANON KABUSHIKI KAISHA, Tokyo (JP)

(72) Inventor: Jun Tanaka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/500,219

(22) Filed: Nov. 2, 2023

(65) Prior Publication Data
US 2024/0064257 A1 Feb. 22, 2024

Related U.S. Application Data

(63) Continuation of application No. 18/058,990, filed on Nov. 28, 2022, now Pat. No. 11,849,092.

(30) Foreign Application Priority Data

Dec. 13, 2021 (JP) ................. 2021-201767

(51) Int. Cl.
*H04N 1/327* (2006.01)
*H04N 1/00* (2006.01)
(52) U.S. Cl.
CPC ..... *H04N 1/32745* (2013.01); *H04N 1/00037* (2013.01); *H04N 1/00079* (2013.01); *H04N 2201/0017* (2013.01)

(58) Field of Classification Search
CPC .......... H04N 1/32745; H04N 1/00037; H04N 1/00079; H04N 2201/0017;
(Continued)

(56) References Cited

U.S. PATENT DOCUMENTS 7,895,314 B1 * 2/2011 Russell ................ H04L 41/026
709/224
2007/0043816 A1 2/2007 Ishibashi
(Continued)

FOREIGN PATENT DOCUMENTS

JP 2008040727 A 2/2008

OTHER PUBLICATIONS

Office Action issued in U.S. Appl. No. 18/058,990 mailed Mar. 30, 2023.
(Continued)

*Primary Examiner* — Kent Yip
(74) *Attorney, Agent, or Firm* — ROSSI, KIMMS & McDOWELL LLP

(57) ABSTRACT

A technique that prevents an unnecessary notification to a user. A non-transitory computer-readable storage medium storing a control program causing a computer of an information processing apparatus to execute a control method including a reception step of receiving an event generated in a device, a setting step of setting a user who is a destination of a notification based on the event received in the reception step according to a type of the event received in the reception step, first information showing a group for each type of an event, and second information showing a group for each user, and a notification step of transmitting a notification based on the event received in the reception step to the user set in the setting step.

14 Claims, 13 Drawing Sheets

(58) Field of Classification Search
CPC .... H04N 2201/3218; H04N 2201/3219; G06F 3/1235
USPC ........................................................ 358/1.15
See application file for complete search history.

(56) References Cited

U.S. PATENT DOCUMENTS

| | | | |
|---|---|---|---|
| 2007/0172042 A1* | 7/2007 | Winikoff | H04M 3/436 379/142.05 |
| 2008/0228915 A1* | 9/2008 | Tamura | H04L 67/025 709/224 |
| 2009/0164640 A1* | 6/2009 | Schultz | G06Q 10/00 709/227 |
| 2018/0097968 A1 | 4/2018 | Sato | |
| 2021/0099608 A1 | 4/2021 | Kamihisa et al. | |
| 2022/0321670 A1 | 10/2022 | Kodama | |

OTHER PUBLICATIONS

Notice of Allowance issued in U.S. Appl. No. 18/058,990, mailed Sep. 27, 2023.

\* cited by examiner

*FIG. 5*

| Account name | Name | Department | Post |
|---|---|---|---|
| taro.shimomaruko | Taro Simomaruko | Personnel | Section Manager |
| ichiro.kosugi | Ichiro Kosugi | Personnel | General Staff |
| kotaro.simomaru | Kotaro Simomura | Facility Management | Section Manager |
| hanako.kawasaki | Hanako Kawasaki | Facility Management | Chief Staff |
| saburo.toride | Saburo Toride | Facility Management | General Staff |

| Notification Event Type | Target Post | Target Department |
|---|---|---|
| Warning of Consumable Item | All | All |
| FAX Reception | All | Personnel |
| Used Amount Report | Chief Staff, Section Manager | Facility Management |
| Security Warning | Section Manager | All |
| Charging Information | Section Manager | Facility Management |

| Account name | Name | Department | Post | Working Form |
|---|---|---|---|---|
| taro.shimomaruko | Taro Simomaruko | Personnel | Section Manager | Office |
| ichiro.kosugi | Ichiro Kosugi | Personnel | General Staff | Telework |
| kotaro.simomaru | Kotaro Simomura | Facility Management | Section Manager | Recess |
| hanako.kawasaki | Hanako Kawasaki | Facility Management | Chief Staff | Vacation |
| saburo.toride | Saburo Toride | Facility Management | General Staff | Satellite Office |

*FIG. 12*

| Notification Event Type | Target Post | Target Department | Working Form |
|---|---|---|---|
| Warning of Consumable Item | All | All | Office |
| FAX Reception | All | Personnel | Office |
| Used Amount Report | Chief Staff, Section Manager | Facility Management | All |
| Security Warning | Section Manager | All | All |
| Charging Information | Section Manager | Facility Management | All |

STORAGE MEDIUM STORING PROGRAM CAUSING COMPUTER OF INFORMATION PROCESSING APPARATUS TO EXECUTE CONTROL METHOD FOR SETTING A USER AS A DESTINATION OF A NOTIFICATION OF AN EVENT, CONTROL METHOD FOR INFORMATION PROCESSING APPARATUS, AND INFORMATION PROCESSING SYSTEM

BACKGROUND OF THE INVENTION

Field of the Invention

The present invention relates to a storage medium storing a program causing a computer of an information processing apparatus to execute a control method, a control method for the information processing apparatus, and an information processing system.

Description of the Related Art

A conventional device management system that connects a user terminal like a mobile terminal to an office device like an MFP through a chat application or a management application is known. In such a device management system, a user can remotely operate an MFP and can refer to information in the MFP from a user terminal.

Moreover, some of chat applications and management applications have a function of notifying a user terminal of a phenomenon occurred in an MFP and have a function to communicate with an NAS (Network Attached Storage) or an attendance management system.

In the meantime, since many users access to the MFP through the chat application or the management application in the above-mentioned device management system, the MFP may transmit a notification unnecessary for a user to a user terminal of the user. In order to prevent such an unnecessary notification, there is a known technique that switches a notification method according to a device status of a user terminal that receives a notification (see Japanese Laid-Open Patent Publication (Kokai) No. 2008-40727 (JP 2008-40727A)).

However, a device management system that connects many user terminals to an office device like an MFP needs to notify each user terminal suitably. There is a method that a system administrator beforehand registers notification contents and information about users who are notification destinations. However, such registration becomes troublesome when there are many users who should be registered. Moreover, there is a problem that a notification destination must be updated whenever a registered user's information is changed.

SUMMARY OF THE INVENTION

The present invention provides a technique that prevents an unnecessary notification to a user.

Accordingly, an aspect of the present invention provides a non-transitory computer-readable storage medium storing a control program causing a computer of an information processing apparatus to execute a control method including a reception step of receiving an event generated in a device, a setting step of setting a user who is a destination of a notification based on the event received in the reception step according to a type of the event received in the reception step, first information showing a group for each type of an event, and second information showing a group for each user, and a notification step of transmitting a notification based on the event received in the reception step to the user set in the setting step.

According to the present invention, an unnecessary notification to a user can be prevented.

Further features of the present invention will become apparent from the following description of exemplary embodiments with reference to the attached drawings.

BRIEF DESCRIPTION OF THE DRAWINGS

FIG. 5 is a view showing an example of a user information management table according to a first embodiment.

FIG. 6 is a view showing an example of a notification condition management table according to the first embodiment.

FIG. 10 is a view showing an example of a user information management table according to a second embodiment.

FIG. 12 is a view showing an example of a notification condition management table according to the second embodiment.

DESCRIPTION OF THE EMBODIMENTS

Figure 1:
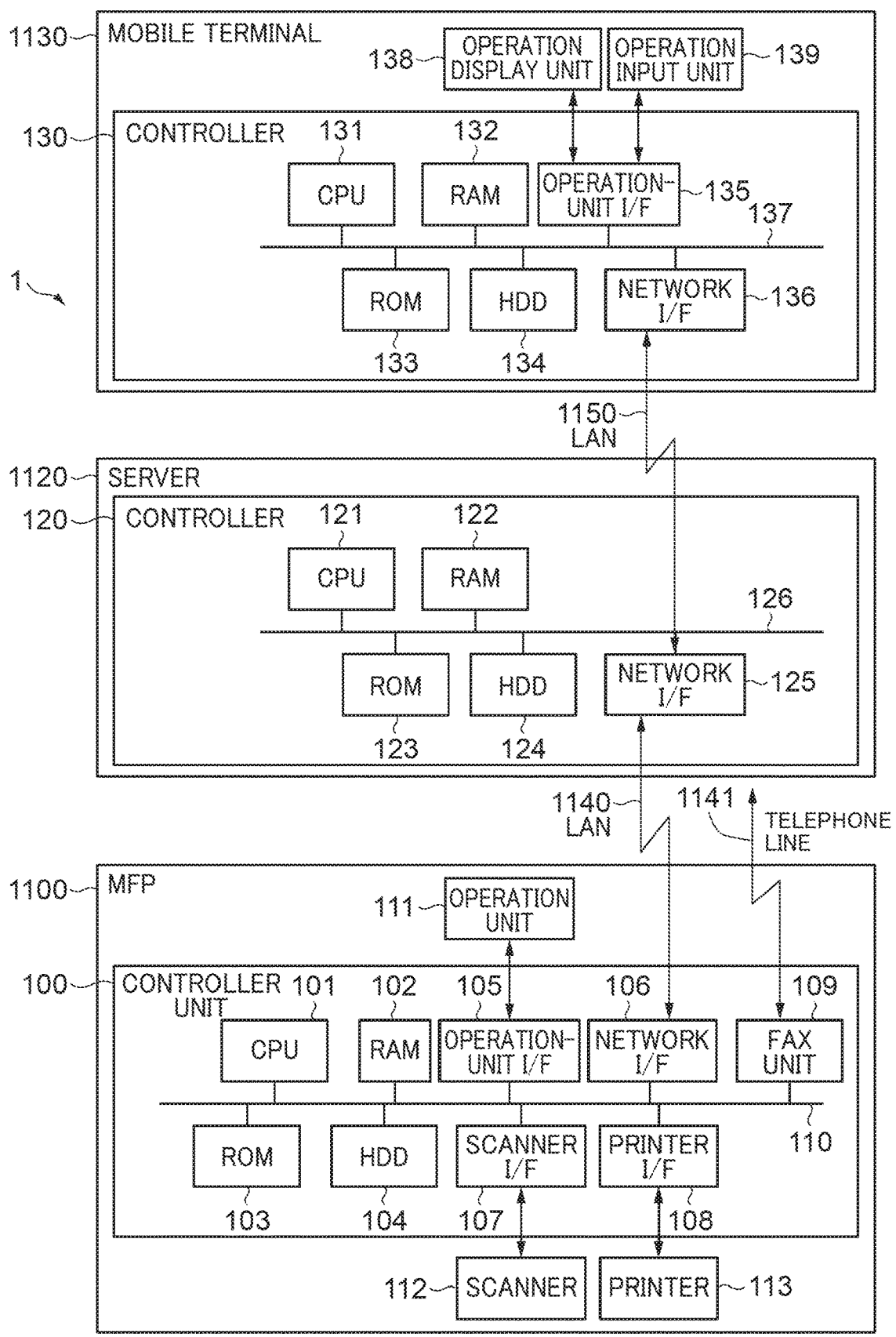
FIG. 1 is a block diagram schematically showing an entire configuration of a device management system according to each embodiment of the present invention.

Hereinafter, a device management system 1 according to each embodiment of the present invention is described by referring to the drawings.

FIG. 1 is a block diagram schematically showing an entire configuration of the device management system 1. The device management system 1 in FIG. 1 is provided with an MFP 1100 (a first-type information processing apparatus) that is an occurrence origin of at least one phenomenon, a mobile terminal 1130 (a second-type information processing apparatus) that is associated with an account of a user, and a server 1120 (a device management apparatus).

The MFP 1100 has functions, such as copying and printing, and is connected to the server 1120 through a network like a LAN 1140. The MFP 1100 is provided with an operation unit 111, a scanner 112, a printer 113, and a controller unit 100 that is connected to them.

The controller unit 100 is provided with a CPU 101, a RAM 102, a ROM 103, an HDD 104, an operation-unit I/F 105, a network I/F 106, a scanner I/F 107, a printer I/F 108, and a FAX unit 109. These units are mutually connected through a system bus 110.

The CPU 101 runs various control programs to control operations of the entire MFP 1100. The CPU 101 boots the MFP 1100 on the basis of a boot program stored in the ROM 103. Moreover, the CPU 101 reads a control program stored in the HDD 104 and executes a predetermined process with using the RAM 102 as a work area.

The HDD 104 stores various control programs including functions, such as copying and printing, and stores scan data read by the scanner 112.

The operation-unit I/F 105 controls data input/output communication with the operation unit 111.

The network I/F 106 is connected to the LAN 1140 and controls input and output of information through the LAN 1140.

The scanner I/F 107 inputs image data from the scanner 112 and inputs/outputs scanner control data.

The printer I/F 108 outputs output image data to the printer 113 and inputs/outputs printer control data.

The FAX unit 109 transmits and receives FAX data through a telephone line 1141.

The operation unit 111 is provided with input devices, such as a touch panel and hard keys, and display devices, such as an LDC and LEDs. The operation unit 111 is an interface that displays an instruction input by a user and displays information to the user. The hard keys include a start button used to designate start of scanning of a paper document.

The scanner 112 is provided with an optical reading device like a CCD and has a function that scans a paper medium optically and reads as electronic image data. Moreover, the scanner 112 is provided with an automatic document feeder (ADF) and has a function that automatically feeds a document one by one to the optical reading device from a bundle of paper documents stacked on a document tray and ejects a document after reading a document. A sensor can determine whether documents are stacked on the document tray of the ADF.

The printer 113 has a function that prints electronic image data as an image on a recording medium like a sheet.

The server 1120 is connected to the MFP 1100 through the network like the LAN 1140 and receives notification events, such as a log and a notification, transmitted from the MFP 1100. Moreover, the server 1120 is also connected to the mobile terminal 1130 through a network like a LAN 1150, and transmits and receives a message with the mobile terminal 1130.

The server 1120 has a controller 120 connectable to the LANs 1140 and 1150. The controller 120 is provided with a CPU 121, a RAM 122, a ROM 123, an HDD 124, and a network OF 125. These units are mutually connected through a system bus 126.

The CPU 121 runs various control programs to control operations of the entire server 1120. The CPU 121 reads a control program stored in the ROM 123 or the HDD 124 and executes a predetermined process with using the RAM 122 as a work area.

The HDD 124 stores various programs, such as a control program that receives an instruction and a message to the MFP 1100 and a control program that transmits a message to the mobile terminal 1130.

The network OF 125 controls input and output of information through the LANs 1140 and 1150.

The mobile terminal 1130 is connected to the server 1120 through the network like the LAN 1150 and transmits and receives a message with the server 1120. The mobile terminal 1130 is provided with an operation-display unit 138, an operation input unit 139, and a controller 130 connected to them.

The controller 130 is provided with a CPU 131, a RAM 132, a ROM 133, an HDD 134, and a network OF 136. These units are mutually connected through a system bus 137.

The CPU 131 runs various control programs to control operations of the entire mobile terminal 1130. The CPU 131 reads a control program stored in the ROM 133 or the HDD 134 and executes a predetermined process with using the RAM 132 as a work area.

The HDD 134 stores various programs, such as a control program that receives a message from the server 1120 in order to display a notification from the MFP 1100 and displays a screen.

The network OF 136 controls input and output of information through the LAN 1150.

The operation-unit OF 135 controls data output communication to the operation-display unit 138 and data input communication from the operation input unit 139.

In addition, the device management system 1 includes at least one additional user terminal (the second-type information processing apparatus (not shown in FIG. 1)) that is different from the mobile terminal 1130 and is connected to the server 1120 through the network. The additional user terminal has the similar hardware configuration (FIG. 1) as the mobile terminal 1130 and is associated with an account of a user who is different from the user of the mobile terminal 1130 that is managed by a user information management table 501 (FIG. 5). The additional user terminal may be a mobile terminal or a terminal like a desktop PC of which the position is fixed.

Figure 2:
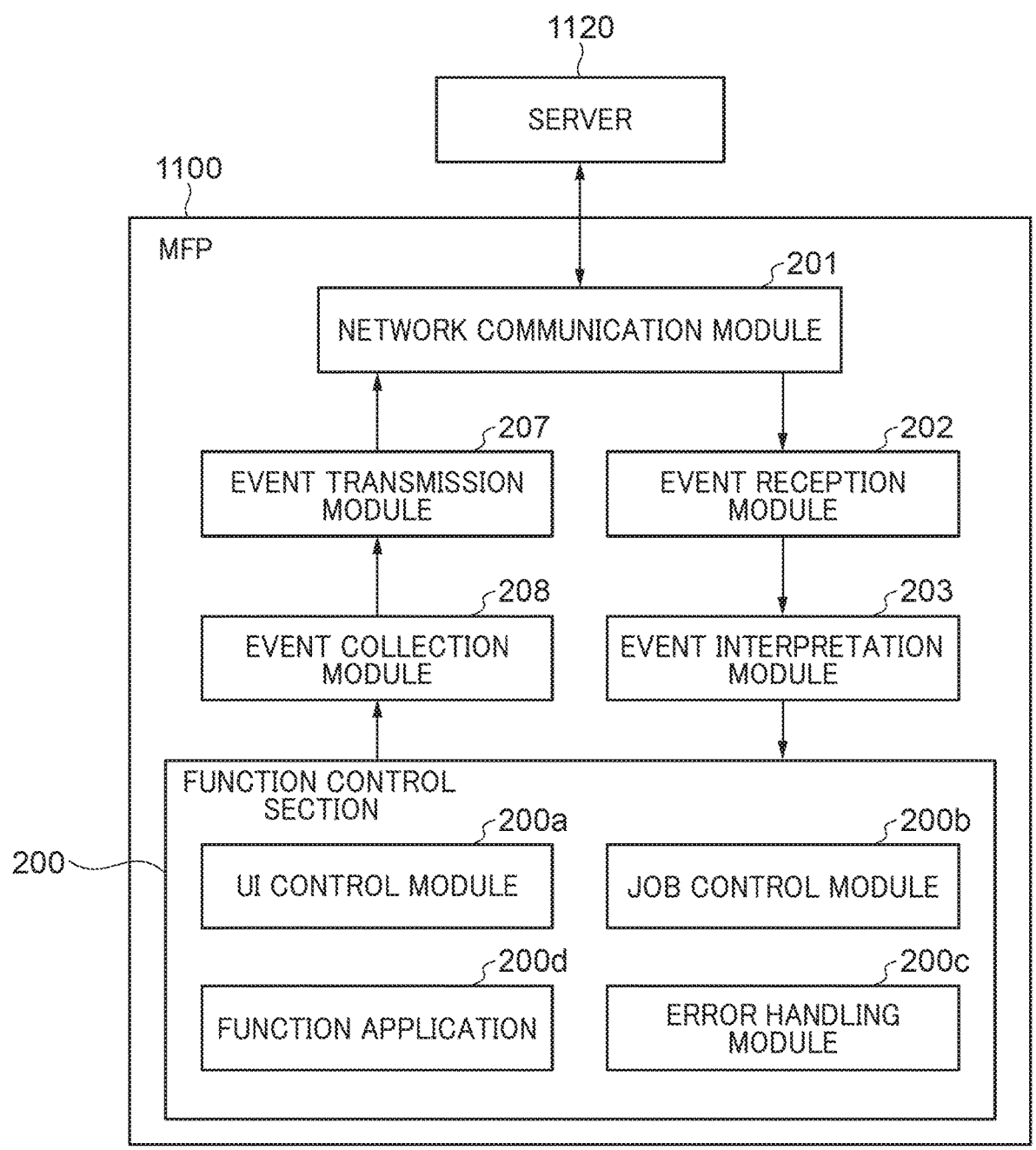
FIG. 2 is a block diagram showing a software configuration of an MFP shown in FIG. 1.

FIG. 2 is a block diagram showing a software configuration of the MFP 1100. As shown in FIG. 2, function modules including a function control section 200, a network communication module 201, an event reception module 202, an event interpretation module 203, an event transmission module 207, and an event collection module 208 operate in the MFP 1100.

In each embodiment of the present invention, a software program that achieves each of the above-mentioned function modules is stored in one memory storage unit among the RAM 102, ROM 103, and HDD 104, and is executed by the CPU 101.

In the function control section 200, the software that achieves various functions using the scanner 112, printer 113, LAN 1140, and the above-mentioned memory storage unit operates. The function control section 200 is provided with a UI control module 200a, a job control module 200b, an error handling module 200c, and function applications 200d.

The UI control module 200a has a function that displays a screen that is operated by a user on the operation unit 111 (FIG. 1) through the operation-unit OF 105 and a function that transfers a content of an operation of a user to other software. The UI control module 200a mainly controls an operation to the hardware of the MFP 1100 and displaying.

The function applications (software) 200d respectively operate functions, such as copying, printing, and mail transmission. The function applications 200d operate using an operation content of a user transferred from the UI control module 200a, data reception through the network like the LAN 1140, etc., as triggers. Moreover, when a certain phenomenon (a first phenomenon) occurs in a certain function of the MFP 1100, one of the function applications 200d corresponding to the certain function generates an event concerning the first phenomenon and transmits it to the event collection module 208.

In response to a job execution instruction from one of the function applications 200d, the job control module 200b controls the scanner 112 through the scanner OF 107 to execute scanning or controls the printer 113 through the printer OF 108 to execute printing.

When receiving a notification about an abnormal status of the job control module 200b, the printer 113, the scanner 112, or the like, the error handling module 200c instructs the entire device management system 1 to stop operations or to shift to degeneration operations.

The network communication module 201 transmits and receives information with the server 1120 through the network like the LAN 1140.

When the information received by the network communication module 201 is an event, the event reception module 202 transmits the event to the event interpretation module 203.

When receiving the event from the event reception module 202, the event interpretation module 203 interprets a content of a device control instruction in the event and sends an execution instruction to one of the function applications 200d in accordance with the interpreted content.

When receiving an event from one of the function applications 200d, the event collection module 208 selects information about the event, adds the information to data of the event, shapes the data, and stores it as a notification event. Moreover, when receiving a warning or control information from the job control module 200b or the error handling module 200c, the event collection module 208 shapes data about the warning or the control information in the same manner and stores it as a notification event.

The event transmission module 207 (transmission unit) transmits a notification event stored by the event collection module 208 to the server 1120 through the network communication module 201.

Figure 3:
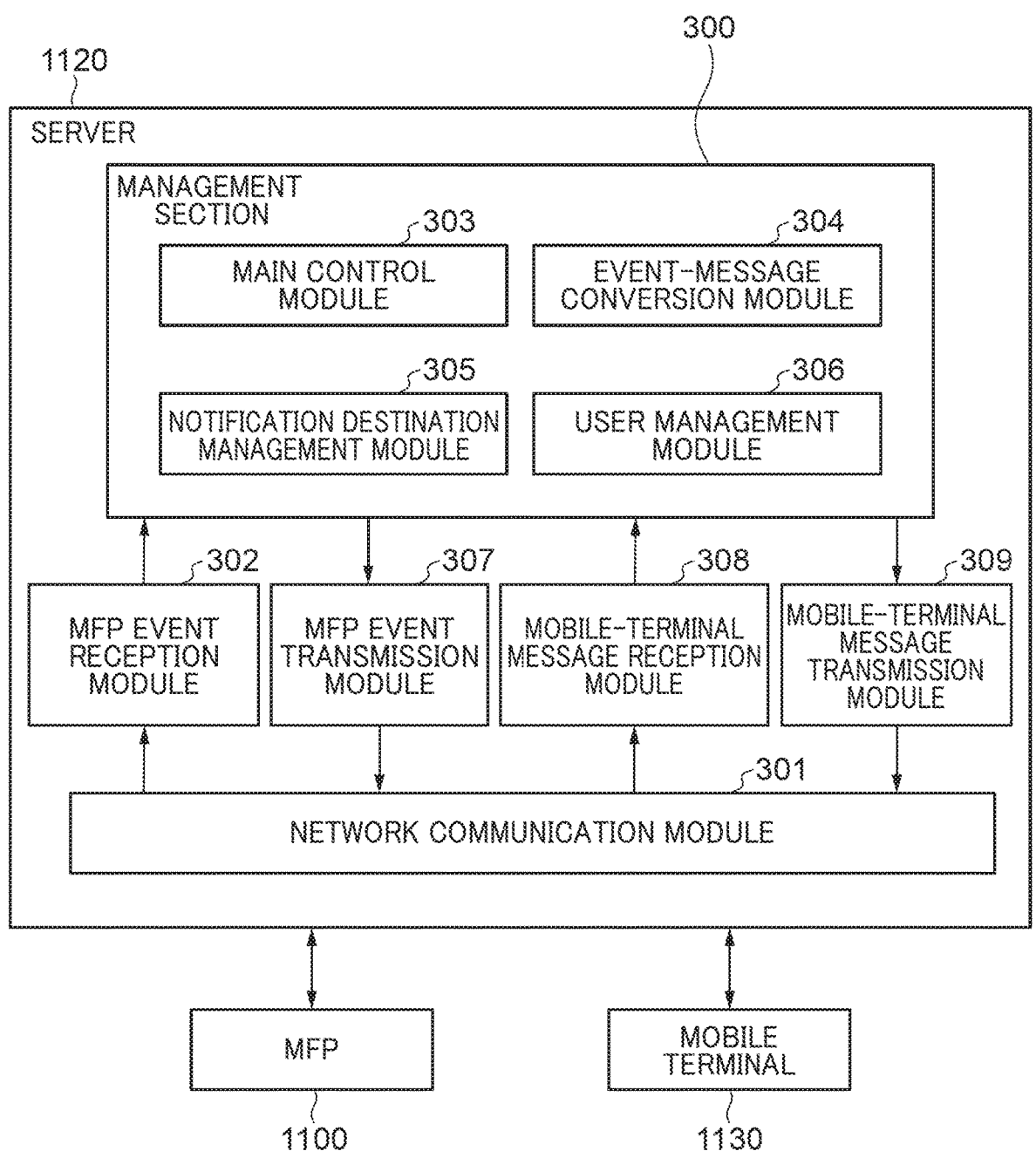
FIG. 3 is a block diagram showing a software configuration of a server shown in FIG. 1.

FIG. 3 is a block diagram showing a software configuration of the server 1120. As shown in FIG. 3, function modules including a management section 300, a network communication module 301, an MFP event reception module 302, an MFP event transmission module 307, a mobile terminal message reception module 308, and a mobile terminal message transmission module 309 operate in the server 1120.

In the specification, a software program that achieves each of the above-mentioned function modules is stored in the RAM 122, the ROM 123, or the HDD 124, and is executed by the CPU 121.

The management section 300 has a main control module 303, an event-message conversion module 304, a notification destination management module 305, and a user management module 306.

The network communication module 301 transmits and receives information with the MFP 1100 through the network like the LAN 1140. Moreover, the network communication module 301 transmits and receives information with the mobile terminal 1130 through the network like the LAN 1150.

When the information received by the network communication module 301 is an event, the MFP event reception module 302 transmits the notification event to the main control module 303.

When receiving the notification event from the MFP event reception module 302, the main control module 303 converts the notification event into a message that will be transmitted to the mobile terminal 1130. A notification event is converted into a message according to the information held in the event-message conversion module 304.

The notification destination management module 305 (first management unit) manages a condition of a transmission destination (notification destination) that is determined for every notification event type. Specifically, the notification destination management module 305 manages a notification condition management table 601 (FIG. 6) that defines information about authority that allows a process to a phenomenon given by a notification event. The details of the notification condition management table 601 will be mentioned later.

The user management module 306 (a second management unit) manages accounts of users including the user of the mobile terminal 1130 and the user information management table 501 (FIG. 5) that defines the information about the authorities thereof. The details of the user information management table 501 will be mentioned later.

The main control unit 303 determines a transmission destination (the mobile terminal 1130 in the description) of the message converted in accordance with the information managed by the notification destination management module 305 and the user management module 306. After that, the main control module 303 generates the information about the account of the transmission destination and a message transmission instruction including the converted message, and transmits it to the mobile terminal message transmission module 309.

When receiving the message transmission instruction from the main control module 303, the mobile terminal message transmission module 309 transmits the message to the mobile terminal 1130 through the network communication module 301.

The mobile terminal message transmission module 309 transmits the message to the mobile terminal 1130, when communication with the mobile terminal 1130 is established by referring to the information like the IP address associated with the information about the account included in the message transmission instruction. The mobile terminal message transmission module 309 can be achieved by a method that holds a message in an area corresponding to the account of the mobile terminal 1130 and transmits the message concerned in response to an obtainment request from the mobile terminal 1130.

The mobile terminal message reception module 308 receives a message from the mobile terminal 1130 through the network communication module 301.

When receiving a message from the mobile terminal message reception module 308, the main control module 303 converts the message into a notification event. A message is converted into a notification event according to the information held in the event-message conversion module 304.

The main control module 303 extracts the information about the account of the mobile terminal 1130 that is the transmitting source of the message from the information managed by the user management module 306. After that, the main control module 303 generates an event transmission instruction including the extracted account information and the converted notification event and transmits it to the MFP event transmission module 307.

When receiving the event transmission instruction from the main control module 303, the MFP event transmission module 307 transmits the notification event to the MFP 1100 through the network communication module 301.

Figure 4:
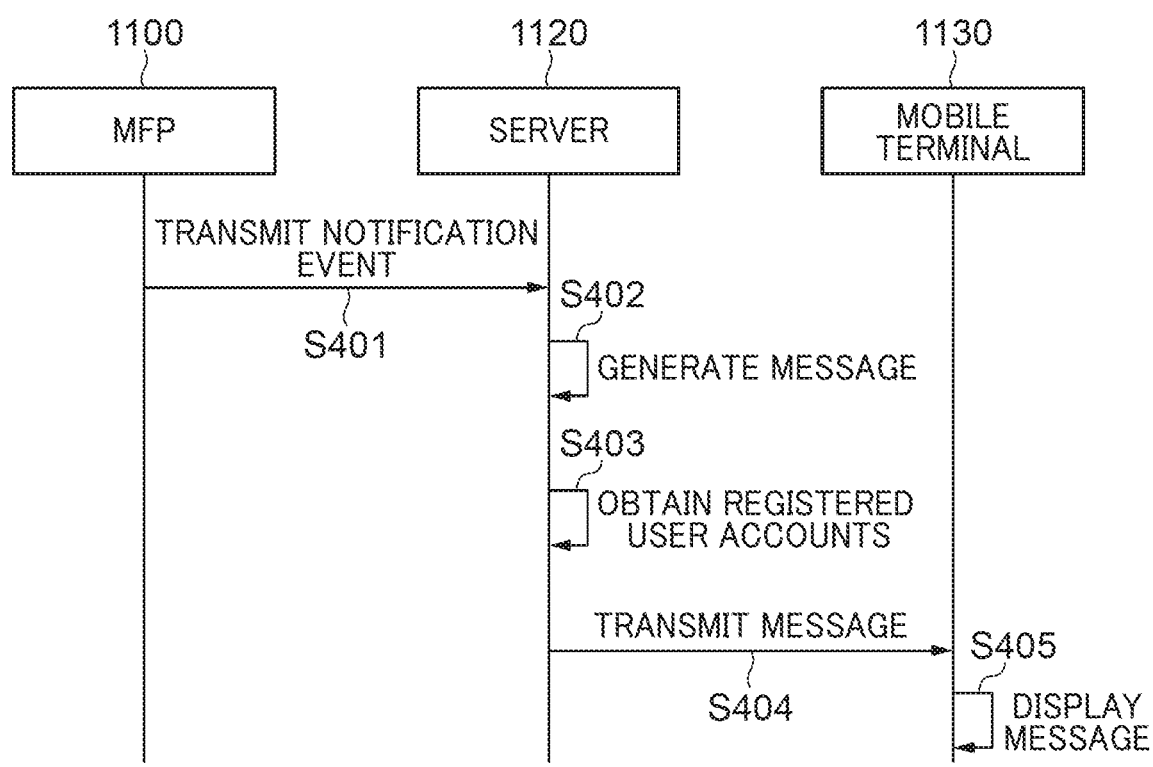
FIG. 4 is a view showing a sequence of a general message notification process executed by the server to notify a mobile terminal in FIG. 1 when a certain phenomenon occurs in the MFP.

FIG. 4 is a view showing a sequence of a general message notification process executed by the server 1120 to notify the mobile terminal 1130 when a certain phenomenon occurs in the MFP 1100.

When the phenomenon occurs in the MFP 1100, the MFP 1100 generates a notification event based on the phenomenon and transmits it to the server 1120 in a step S401.

When the server 1120 receives the notification event from the MFP 1100, the main control module 303 generates a message in a step S402.

In a step S403, the main control module 303 obtains all the user accounts managed by (registered to) the user management module 306 and determines all the obtained accounts as the notification destinations. It should be noted that the user accounts include the account of the mobile terminal 1130.

In step S404, the main control module 303 transmits the message generated in the step S402 to all the accounts including the account of the mobile terminal 1130 determined as the notification destinations in the step S403.

When receiving the message transmitted from the server 1120 in the step S404, the mobile terminal 1130 displays the message on the operation-display unit 138 in a step S405. And then, this sequence is finished.

Next, the message transmission from the server 1120 to the mobile terminal 1130 in a first embodiment will be described.

FIG. 5 is a view showing an example of the user information management table according to the first embodiment. The user information management table 501 manages the information about the accounts that are managed by the user management module 306 and enable exchange of messages with the server 1120.

As shown in FIG. 5, the user information management table 501 includes account names, user names, departments to which users belong, and posts of users as the information about the accounts. The user management module 306 retrieves an account on the basis of the information about the accounts managed by the user information management table 501 and extracts information.

FIG. 6 is a view showing an example of the notification condition management table 601 according to the first embodiment. The notification condition management table 601 manages notification conditions to the mobile terminal 1130 managed by the notification destination management module 305.

The notification condition management table 601 associates a notification event type with a target post (post information) and target department (belonging information) as the notification conditions of a user who becomes a notification destination. The notification destination management module 305 determines the levels of the target post and target department that becomes the notification destination of the notification event on the basis of the notification condition management table 601.

The notification of "warning of consumable item", which is one of the notification event types in the notification condition management table 601, notifies a user of a lack of a consumable item of the MFP 1100. Any user who notices this notification needs to supply the consumable item urgently. Accordingly, both the target post and target department, which show the authority to cope with the phenomenon of the lack of the consumable item, are set to "all".

The notification of "FAX reception", which is one of the notification event types in the notification condition management table 601, notifies a user that the MFP 1100 has received FAX. For example, when only the personnel department exchanges a document by FAX, the target department and target post, which show the authority to cope with the phenomenon of the FAX reception, are respectively set to "personnel" and "all". This setting prevents the unnecessary notification of "FAX reception" to departments that do not use FAX.

Moreover, the notification of "used amount report", which is one of the notification event types in the notification condition management table 601, notifies a user of the used amount of the MFP 1100 periodically and is used to grasp the use frequency of the MFP 1100. For example, the authority to cope with the phenomenon of "used amount report" to grasp the use frequency of the MFP 1100 shall be given to a chief staff and upper post in the facility management department that manages the MFP 1100. In this case, the target department is set to the "facility management" department and the target post is set to "chief staff and section manager" as the notification destination. This setting prevents the excess report from reaching to a user who is not involved with the management job.

The notification of "security warning", which is one of the notification event types in the notification condition management table 601, notifies a user that the MFP 1100 has received an operation having a security problem. For example, when the authority to cope with the phenomenon of "security warning" to determine presence of a problem of an operation to the MFP 1100 and to share the warning in all the users only when there is a problem is given to a section manager, the target post is set to "section manager" and the target department is set to "all" as the notification destination. This setting prevents the unnecessary notification to a user who does not need to determine the presence of a problem of an operation to the MFP 1100.

The notification of "charging information", which is one of the notification event types in the notification condition management table 601, notifies a user of a charging amount etc. in a case of charging according to the used amount of the MFP 1100. For example, when the authority to cope with the phenomenon of "charging information" to settle a charging amount is given to a section manager in the facility management department that manages the MFP 1100, the target post is set to "section manager" and the target department is set to the "facility management" department as the notification destination. This setting prevents the unnecessary notification to a user who does not perform a settlement process.

Figure 7:
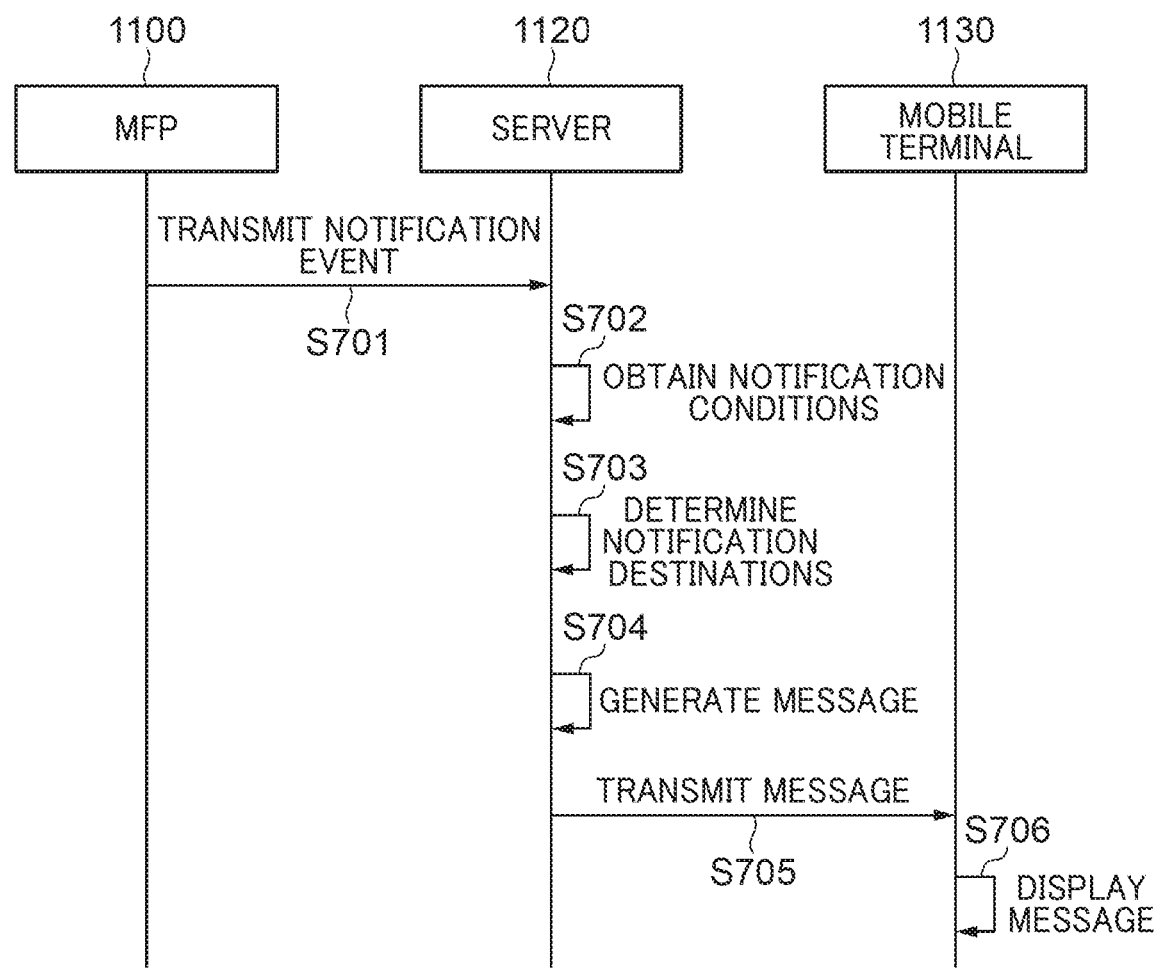
FIG. 7 is a view showing a sequence of a message notification process according to the first embodiment executed by the server to notify the mobile terminal when a certain phenomenon occurs in the MFP.

FIG. 7 is a view showing a sequence of a message notification process according to the first embodiment executed by the server 1120 to notify the mobile terminal 1130 when a certain phenomenon occurs in the MFP 1100.

When the phenomenon occurs in the MFP 1100, the MFP 1100 generates a notification event based on the phenomenon and transmits it to the server 1120 in a step S701.

In a step S702, the main control module 303 obtains the target post and target department (notification conditions) corresponding to the notification event transmitted from the MFP 1100 in the step S701 from the notification destination management module 305.

In a step S703, the main control module 303 determines accounts (notification destinations) that are applicable to the target post and target department (notification conditions) obtained in the step S702. In addition, in this embodiment, the determined notification destinations include the account of the mobile terminal 1130.

In a step S704, the main control module 303 generates a message from the notification event transmitted from the MFP 1100.

In a step S705, the main control module 303 transmits the message generated in the step S704 to the accounts determined as the notification destinations in the step S703.

When receiving the message transmitted from the server 1120 in the step S705, the mobile terminal 1130 displays the message on the operation-display unit 138 in a step S706. And then, this sequence is finished.

Figure 8:
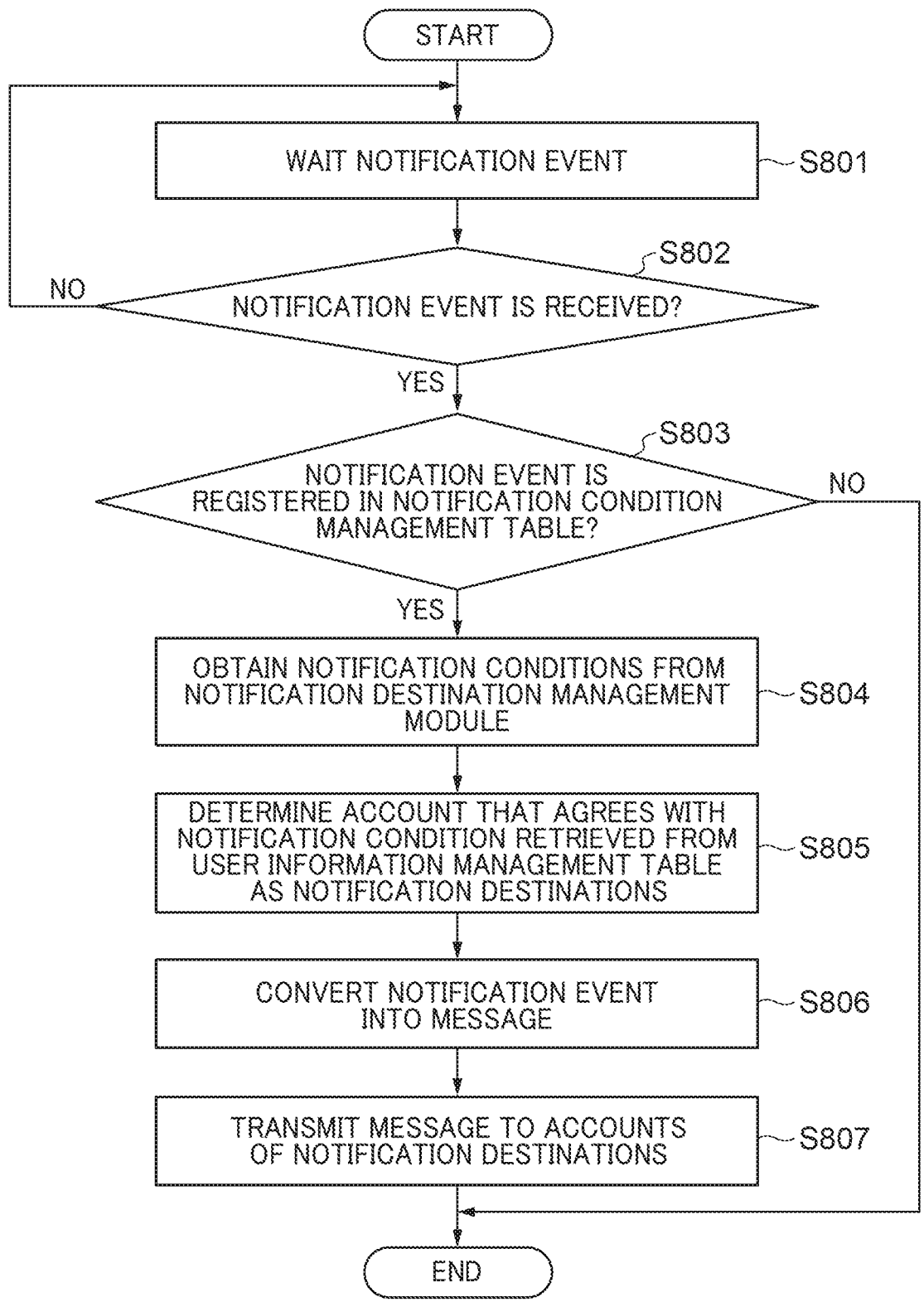
FIG. 8 is a flowchart showing details of the process in steps S701 through S705 in FIG. 7 according to the first embodiment executed by the server.

FIG. 8 is a flowchart showing details of the process in the steps S701 through S705 in FIG. 7 executed by the server 1120.

In a step S801, the MFP event reception module 302 (a first obtainment unit) waits for a reception of the notification event from the MFP 1100 through the LAN 1140.

Next, in a step S802, the MFP event reception module 302 determines whether the notification event that is waited in the step S801 is received. When it is determined that the notification event is not received (NO in the step S802), the process returns to the step S801. In the meantime, when it is determined that the notification event is received (YES in the step S802), the MFP event reception module 302 transmits the received notification event to the main control module 303, and the process proceeds to a step S803.

In the step S803, the main control module 303 determines whether the notification event received from the MFP event reception module 302 is registered in the notification condition management table 601 of the notification destination management module 305. When the notification event is not registered in the notification condition management table 601 (NO in the step S803), this process is finished as-is. In the meantime, when the notification event is registered in the notification condition management table 601 (YES in the step S803), the process proceeds to a step S804.

In the step S804, the main control module 303 (a second obtainment unit) obtains the notification conditions from the notification destination management module 305. Specifically, the main control module 303 first transmits a notification condition request, which includes the notification event transmitted from the MFP 1100, to the notification destination management module 305. The notification destination management module 305 retrieves the notification event type included in the received notification condition request from the notification condition management table 601, extracts the target post and target department associated with the retrieved notification event type, and transmits them to the main control module 303 as a response to the notification condition request. The main control module 303 obtains the target post and target department that are transmitted from the notification destination management module 305 as the notification conditions.

In a step S805, the main control module 303 (a determination unit) retrieves all accounts that agree with the notification conditions obtained in the step S804 from the user information management table 501 using the user management module 306 and determines them as notification destinations. Specifically, the main control module 303 transmits the notification destination request that includes the target post and target department (notification conditions) to the user management module 306. The user management module 306 extracts all accounts that agree with the target post and target department included in the received notification destination request from the user information management table 501, and transmits them to the main control module 303. The main control module 303 determines the accounts transmitted from the user management module 306 as the notification destinations. In addition, in this embodiment, the determined notification destinations include the account of the mobile terminal 1130.

In a step S806, the main control module 303 (a conversion unit) converts the notification event into the message, which will be transmitted to the accounts determined as the notification destinations in the step S805, on the basis of the information in the event-message conversion module 304.

In a step S807, the main control module 303 transmits the message, which is converted from the notification event in the step S806, to the accounts (the account of the mobile terminal 1130, etc.) determined as the notification destinations in the step S805. Specifically, the transmitted message is sent to the mobile terminal message transmission module 309 and is transmitted to the notification destinations (the mobile terminal 1130 etc.) through the network communication module 301. After that, the process in FIG. 8 is finished.

Figure 9:
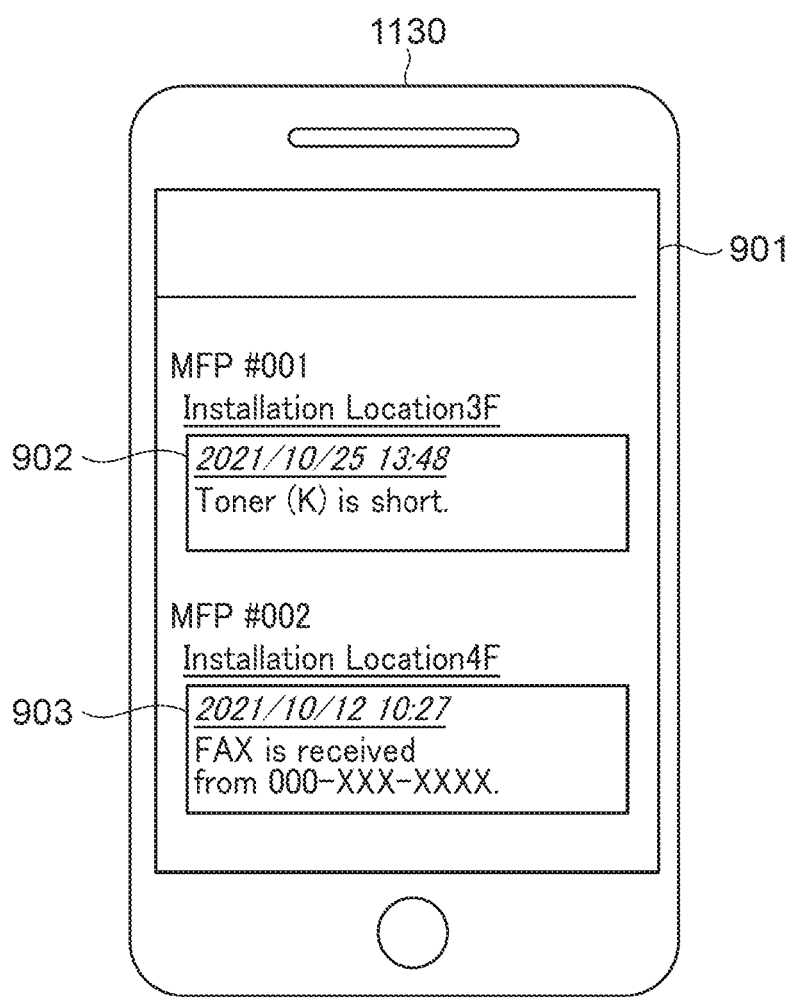
FIG. 9 is an explanatory view showing a message display screen displayed on an operation-display unit of the mobile terminal in a step S706 in FIG. 7.

FIG. 9 is an explanatory view showing a message display screen 901 displayed on the operation-display unit 138 of the mobile terminal 1130 in the step S706 in FIG. 7.

When the mobile terminal 1130 receives the message based on the notification event from the MFP 1100, the message 902 is displayed in the message display screen 901.

It should be noted that another office device (the first-type information processing apparatus, not shown in FIG. 1) having a similar hardware configuration (FIG. 1) and a similar software configuration (FIG. 2) to the MFP 1100 may be connected to the server 1120 through the network. In this case, a message 903 about a phenomenon that occurs in the other office device is also displayed in the message display screen 901 in addition to the message 902 about the phenomenon that occurs in the MFP 1100. The messages 902 and 903 is displayed so as to be arranged in the order of reception time. Although the other office device is an MFP that has the similar hardware configuration (FIG. 1) to the MFP 1100 in the example shown in FIG. 9, it is not limited to this. For example, the other office equipment may be a shredder, a security camera, etc.

Moreover, although the user information management table 501 and the notification condition management table 601 are held within the server 1120 in this embodiment, the configuration is not limited to this as long as the tables are held within the device management system 1. For example, the MFP 1100 may hold the notification condition management table 601. In this case, the MFP 1100 transmits the notification event and its notification conditions together to the server 1120. Moreover, an NAS that is connected to at least one of the server 1120 and the MFP 1100 through the network may hold the user information management table 501 and the notification condition management table 601.

Hereinafter, a second embodiment will be described. Message transmission from the server 1120 to the mobile terminal 1130 in this embodiment will be described.

Hereinafter, configurations of this embodiment that are different from that of the first embodiment are mainly described. The same reference numerals as the first embodiment are applied to the similar configurations to the first embodiment, and the duplicate descriptions are omitted.

In this embodiment, the mobile terminal 1130 and the above-mentioned additional user terminal (the second-type information processing apparatus), which are respectively associated with the accounts of different users, and the server 1120 in the device management system 1 constitute a work management system. The HDD 124 of the server 1120 in this embodiment stores a control program that manages work conditions of users managed by the work management system.

FIG. 10 is a view showing an example of a user information management table 1001 according to this embodiment. The user information management table 1001 includes dynamic information including working forms on the day in addition to static information including the account names, user names, departments, and posts.

The user information management table 1001 is managed by the user management module 306 and is rewritten by the main control module 303 in accordance with the message received by the mobile terminal message reception module 308.

Figure 11:
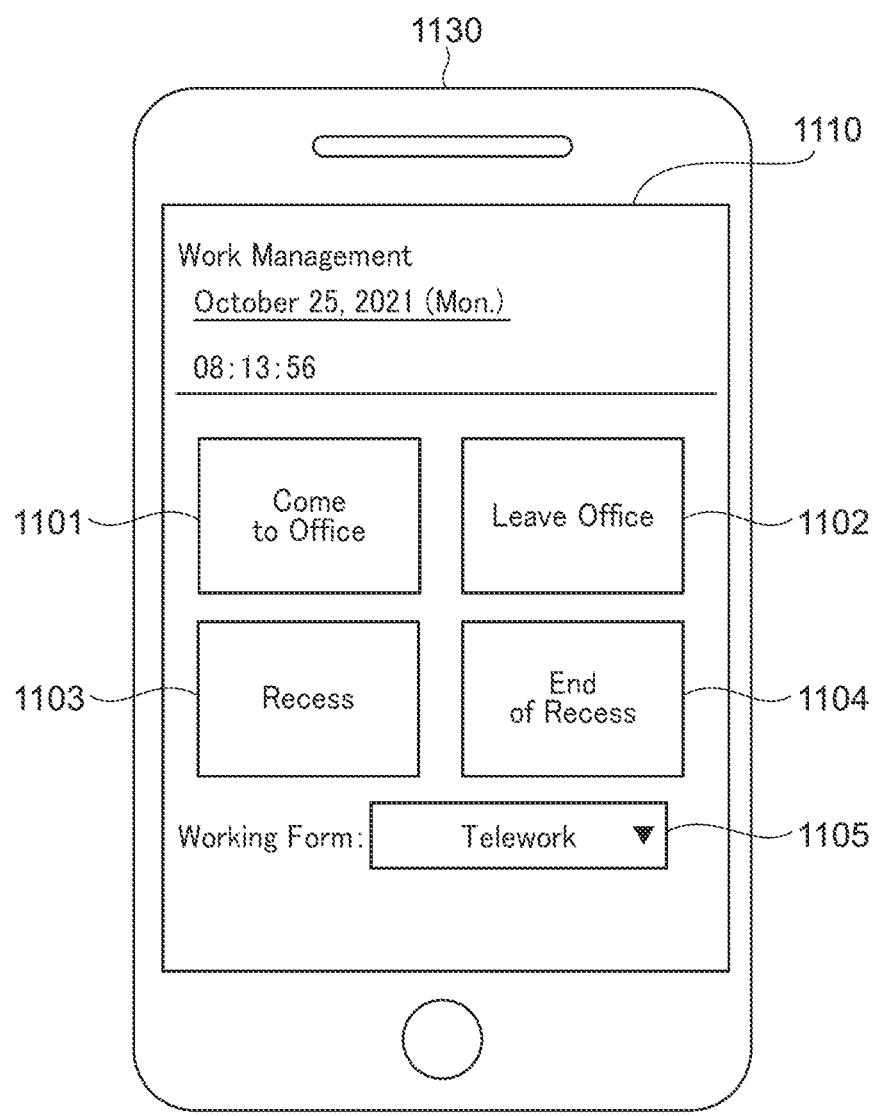
FIG. 11 is an explanatory view showing a UI screen of a mobile terminal according the second embodiment.

FIG. 11 is an explanatory view showing a UI screen 1110 of the mobile terminal 1130 according this embodiment. A UI screen 1110 including buttons 1101 through 1104 and a menu 1105 is displayed on the operation-display unit 138 of the mobile terminal 1130.

When the user presses one of the buttons 1101 through 1104, the CPU 131 of the mobile terminal 1130 transmits a work management message corresponding to the pressed button to the server 1120.

The menu 1105 is a pull down menu that enables selection of a working form. The information about the working form displayed in the menu 1105 in pressing one of the buttons 1101 through 1104 is added to the work management message that will be transmitted. In this embodiment, the working form is selected by the user from the pull-down menu of the menu 1105. Alternatively, the working form may be determined by the CPU 131 on the basis of position information about the mobile terminal 1130 or line information about the LAN 1150.

When receiving the work management message from the mobile terminal 1130A, the mobile terminal message reception module 308 of the server 1120 transmits a message content to the main control module 303. The main control module 303 interprets the message content transmitted from the mobile terminal message reception module 308 and changes the information about the working form in the user information management table 1001 through the user management module 306.

Although the work management system updates the information about the working form of the user of the mobile terminal 1130 in this embodiment, it is not limited to this. For example, the information about the working form of the user of the mobile terminal 1130 may be updated using information of a schedule system, the position information about the mobile terminal 1130, or the line information about the LAN 1150.

FIG. 12 is an explanatory view showing a notification condition management table 1201 according to this embodiment. The notification condition management table 1201 manages notification conditions to the mobile terminal 1130 managed by the notification destination management module 305.

The notification condition management table 1201 includes the notification event type, target post, and target department as with the notification condition management table 601, and further includes a working form of a user who becomes a notification destination associated with a notification event.

Since the notifications of "warning of consumable item" and "FAX reception" among the notification event types require that a user who notices these notification accesses to the MFP 1100 physically and operates it, the working form of each of these notifications is set to "office". This setting prevents the unnecessary notification to a user who is not in the office and cannot operate the MFP 1100.

Moreover, since the notifications of "used amount report", "security warning", "charging information" among the notification event types in the notification condition management table 1201 should be referred to by all users irrespective of the working form, the working form of each of these notifications is set to "all".

Figure 13:
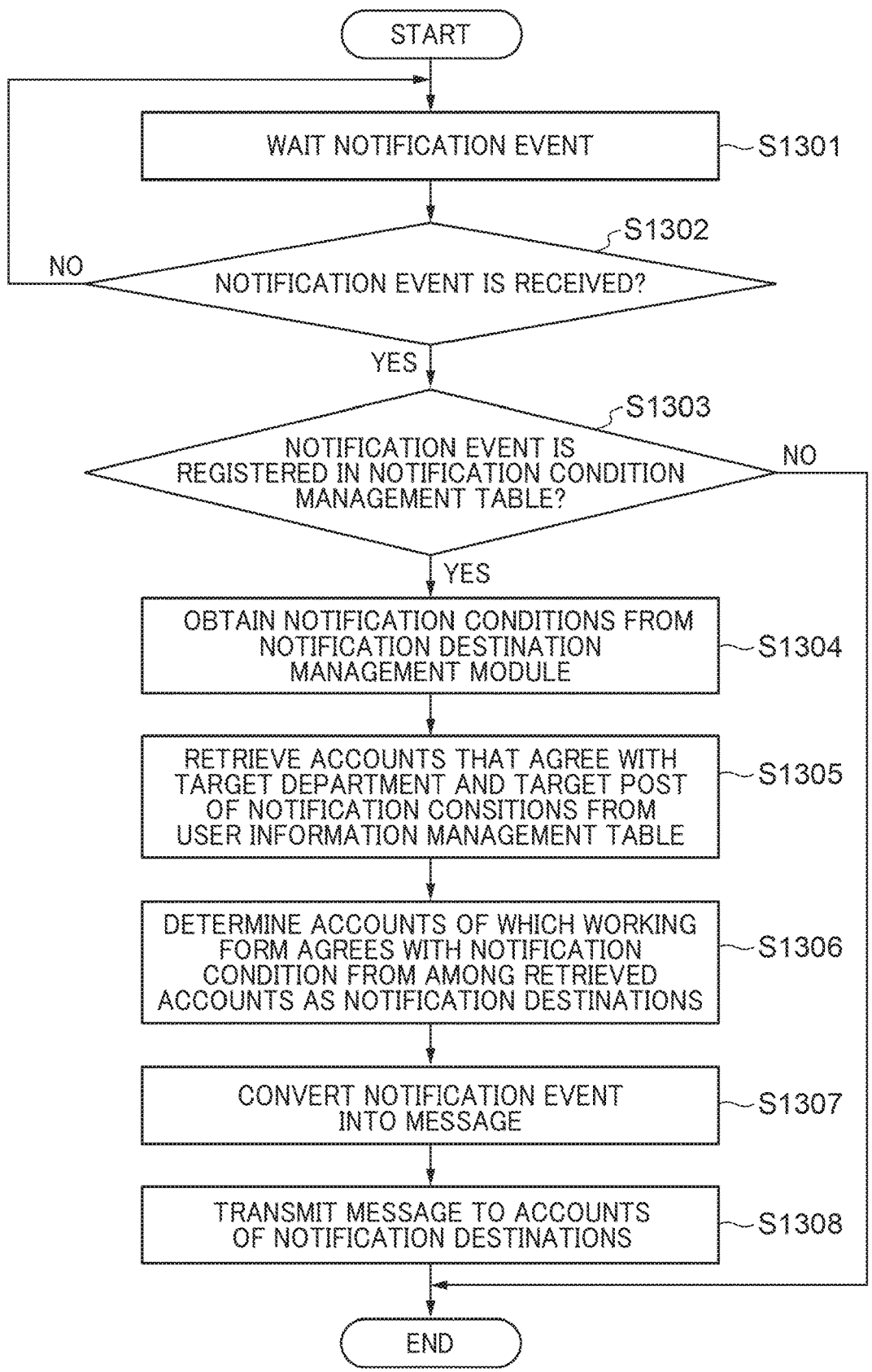
FIG. 13 is a flowchart showing details of the process in steps S701 through S705 in FIG. 7 according to the second embodiment executed by the server.

FIG. 13 is a flowchart showing details of the process in the steps S701 through S705 in FIG. 7 according to this embodiment executed by the server 1120.

In a step S1301, the MFP event reception module 302 waits for a reception of the notification event from the MFP 1100 through the LAN 1140.

Next, in a step S1302, the MFP event reception module 302 determines whether the notification event that is waited in the step S1301 is received. When it is determined that the notification event is not received (NO in the step S1302), the process returns to the step S1301. In the meantime, when it is determined that the notification event is received (YES in the step S1302), the MFP event reception module 302 transmits the received notification event to the main control module 303, and the process proceeds to a step S1303.

In the step S1303, the main control module 303 determines whether the notification event received from the MFP event reception module 302 is registered in the notification condition management table 1201 of the notification destination management module 305. When the notification event is not registered in the notification condition management table 1201 (NO in the step S1303), this process is finished as-is. In the meantime, when the notification event is registered in the notification condition management table 1201 (YES in the step S1303), the process proceeds to a step S1304.

In the step S1304, the main control module 303 obtains the notification conditions (the target post, target department, and working form) from the notification destination management module 305.

In a step S1305, the main control module 303 retrieves accounts that agree with the target post and target department as the notification conditions that are obtained in the step S1304 from among the accounts registered in the user information management table 1001 using the user management module 306.

In a step S1306, the main control module 303 determines accounts of which the working form agrees with the working form of the notification conditions obtained in the step S1304 from among the accounts retrieved in the step S1305 as the notification destinations using the user management module 306. In addition, in this embodiment, the determined notification destinations include the account of the mobile terminal 1130. That is, accounts of which the working form does not agree with the working form obtained in the step S1304 among the accounts retrieved in the step S1305 are excepted from the notification destinations.

In a step S1307, the main control module 303 converts the notification event into the message, which will be transmitted to the accounts determined as the notification destinations in the step S1306, on the basis of the information in the event-message conversion module 304.

In a step S1308, the main control module 303 transmits the message, which is converted from the notification event in the step S1307, to the accounts (the account of the mobile terminal 1130, etc.) determined as the notification destinations in the step S1306. Specifically, the transmitted message is sent to the mobile terminal message transmission module 309 and is transmitted to the notification destinations (the mobile terminal 1130 etc.) through the network communication module 301. After that, this process in FIG. 13 is finished.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201767, filed Dec. 13, 2021, which is hereby incorporated by reference herein in its entirety.

What is claimed is:

1. A non-transitory computer-readable storage medium storing a control program configured to cause a computer of an information processing apparatus to execute a method, the method comprising:
receiving information indicating that an event has occurred in a device;
identifying a first user and a second user that should each receive, based on a type of the event, a notification of the event;
obtaining a status of the first user that should receive, based on the type of the event, the notification of the event;
obtaining a status of the second user that should receive, based on the type of the received event, the notification of the event; and
transmitting, in a first case where the obtained status of the first user that should receive the notification of a first event is a first status and the obtained status of the second user that should receive the notification of the first event is a second status different from the first status, the notification of the first event to the first user without transmitting the notification of the first event to the second user, and transmitting, in a second case where the obtained status of the first user that should receive the notification of a second event is the first status and the obtained status of the second user that should receive the notification of the second event is the second status different from the first status, the notification of the second event to the first user and to the second user.

2. The non-transitory computer-readable storage medium according to claim 1, wherein the status of the first user includes a status indicating that the first user is in an office.

3. The non-transitory computer-readable storage medium according to claim 1, wherein the status of the second user includes a status indicating that the second user is teleworking.

4. The non-transitory computer-readable storage medium according to claim 1, wherein the status of the second user includes a status indicating that the second user is on break.

5. The non-transitory computer-readable storage medium according to claim 1, wherein the status of the second user includes a status indicating that the second user is on vacation.

6. The non-transitory computer-readable storage medium according to claim 1, wherein the status of the second user includes a status indicating that the second user is in a satellite office.

7. The non-transitory computer-readable storage medium according to claim 1, wherein the status of the first user is set by the first user.

8. The non-transitory computer-readable storage medium according to claim 7, wherein the status of the first user is set by an operation of an external apparatus.

9. The non-transitory computer-readable storage medium according to claim 8, wherein the external apparatus is a mobile terminal.

10. The non-transitory computer-readable storage medium according to claim 1, wherein the status of the first user changes based on position information about a mobile terminal of the first user.

11. The non-transitory computer-readable storage medium according to claim 1, wherein the method further comprises:
obtaining, from among first information associating events that may occur in the device with a plurality of target organizational positions of users, target organizational positions of users associated with the first event;
identifying, from among second information associating specific users and specific organization positions of the specific users, users whose specific organizational positions agree with the obtained target organizational positions of users associated with the first event,
wherein the first user and the second user are each identified in the identifying from among the second information.

12. The non-transitory computer-readable storage medium according to claim 1, wherein the method further comprises:
obtaining, from among first information associating events that may occur in the device with statuses of users, a status associated with the first event; and
identifying, from among second information associating specific users and statuses of the specific users, users whose status agrees with the obtained status associated with the first event, wherein notification of the first event is transmitted to the identified users whose status agrees with the obtained status associated with the first event.

13. A control method for an information processing apparatus, the control method comprising:
   receiving information indicating that an event has occurred in a device;
   identifying a first user and a second user that should each receive, based on a type of the event, a notification of the event;
   obtaining a status of the first user that should receive, based on the type of the event, the notification of the event;
   obtaining a status of the second user that should receive, based on the type of the received event, the notification of the event; and
   transmitting, in a first case where the obtained status of the first user that should receive the notification of a first event is a first status and the obtained status of the second user that should receive the notification of the first event is a second status different from the first status, the notification of the first event to the first user without transmitting the notification of the first event to the second user, and transmitting, in a second case where the obtained status of the first user that should receive the notification of a second event is the first status and the obtained status of the second user that should receive the notification of the second event is the second status different from the first status, the notification of the second event to the first user and to the second user.

14. An information processing system comprising:
   a memory storing computer-readable instructions; and
   a processor configured to execute the computer-readable instructions stored in the memory to cause the information processing system to:
   receive information indicating that an event has occurred in a device;
   identify a first user and a second user that should each receive, based on a type of the event, a notification of the event;
   obtain a status of the first user that should receive, based on the type of the event, the notification of the event;
   obtain a status of the second user that should receive, based on the type of the received event, the notification of the event; and
   transmit, in a first case where the obtained status of the first user that should receive the notification of a first event is a first status and the obtained status of the second user that should receive the notification of the first event is a second status different from the first status, the notification of the first event to the first user without transmitting the notification of the first event to the second user, and transmit, in a second case where the obtained status of the first user that should receive the notification of a second event is the first status and the obtained status of the second user that should receive the notification of the second event is the second status different from the first status, the notification of the second event to the first user and to the second user.

* * * * *